United States Patent
Mitani

(10) Patent No.: US 7,599,084 B2
(45) Date of Patent: Oct. 6, 2009

(54) IMAGE PROCESSING APPARATUS AND CONTROL METHOD OF IMAGE PROCESSING APPARATUS

(75) Inventor: Yasutaka Mitani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 322 days.

(21) Appl. No.: 11/462,873

(22) Filed: Aug. 7, 2006

(65) Prior Publication Data

US 2007/0035782 A1    Feb. 15, 2007

(30) Foreign Application Priority Data

Aug. 10, 2005    (JP) .............................. 2005-231480

(51) Int. Cl.
*G06F 3/12* (2006.01)
*H04N 1/23* (2006.01)
*H04N 1/387* (2006.01)
*G06K 9/20* (2006.01)
*G03G 15/00* (2006.01)

(52) U.S. Cl. ...................... 358/1.15; 358/296; 358/474; 358/1.18; 382/317; 399/84; 715/500; 715/501.1

(58) Field of Classification Search ................ 358/1.15, 358/400, 436, 437, 438, 468, 296, 474, 1.18; 382/317; 399/84; 380/243; 715/501.1, 500
See application file for complete search history.

(56) References Cited

U.S. PATENT DOCUMENTS

| 5,168,371 | A | * | 12/1992 | Takayanagi | .................. 358/296 |
| 5,940,188 | A | * | 8/1999 | Kurozasa | ..................... 358/436 |
| 2004/0252330 | A1 | * | 12/2004 | Brown et al. | ................ 358/1.15 |

FOREIGN PATENT DOCUMENTS

| JP | 8-164652 | 6/1996 |
| JP | 2004-34584 | 2/2004 |

* cited by examiner

*Primary Examiner*—Edward L Coles
*Assistant Examiner*—Charlotte M Baker
(74) *Attorney, Agent, or Firm*—Fitzpatrick, Cella, Harper & Scinto

(57) ABSTRACT

An object of the present invention is to enable an image processing apparatus to correspond to plural kinds of data, and to easily and surely perform printout and management of various kinds of and large quantity of data. In the image processing apparatus which includes image printing means, image reading means and storage means capable of storing plural kinds of data, a user specifies kinds of data in the storage means which are desired to be subjected to printout or management processing, and allows a mark type sheet adapted to the kinds of data to be printed. On the other hand, the printout or management processing of data printed on the mark type sheet is controlled on the basis of the presence of marks and the positions of the marks on the mark type sheet, which are read from the mark type sheet.

12 Claims, 13 Drawing Sheets

FIG. 6A
106 LCD

【NAVI-SHEET】

⇨ PRINT     SCAN

FIG. 6B
106

【SELECT STORAGE】

MEMORY CARD   ⇨ HDD    EXTERNAL DEVICE

FIG. 6C
106

【SELECT IMAGE DATA】

⇨ PHOTO   POSTCARD   TEXT   NAME CARD

FIG. 6D
106

[NUMBER OF IMAGE DATA 23]

[NUMBER OF NAVI-SHEETS 1]

FIG. 7

MARK TYPE IMAGE NAVI-SHEET (FOR PHOTO)

1. PRINT SETTING

| PRINT SHEET SIZE | L-SIZE ○ | 2L-SIZE ○ | A4 ○ |

| PRINT WITH MARGIN | YES ○ | NO (MARGINLESS) ○ |

2. IMAGES AND NUMBER OF PRINTS

FIG. 11

MARK TYPE IMAGE NAVI-SHEET (FOR POST CARD)

1. PRINT SETTING

| PRINT SHEET SIZE | POST-CARD ● | ENVELOPE ○ | A4×4 ○ |

| SPECIAL CHARACTER | THIN ○ | BOLD ○ | BRUSH ○ |

| REPLY | ● |

2. ADDRESS SELECTION   ○○○   ○-○○-○

| PRINT | NAME | ADDRESS | YEAR |
|---|---|---|---|
| ● | ○○ ○○ | ○-○○-○, ○○-CHO, ○○-KU, TOKYO-TO | 2005 |
| ○ | ○○ ○○ | ○-○○-○, ○○-CHO, ○○-KU, TOKYO-TO | 2005 |
| ● | ○○ ○○○ | ○-○○-○, ○○-CHO, ○○-SHI, ○○○-KEN | 2005 |
| ● | ○○ ○○ | ○-○○-○, ○○-CHO, ○○-SHI, ○○-KEN | 2005 |
| ○ | ○○ ○○ | ○-○○-○, ○○-CHO, ○○-SHI, ○○-KEN | 2005 |
| ● | ○ ○○ | ○-○○-○, ○○-CHO, ○○-SHI, ○○-KEN | 2005 |
| ● | ○○ ○○ | ○-○○-○, ○○-CHO, ○○-SHI, ○○-KEN | 2005 |
| ○ | ○○ ○○ | ○-○○-○, ○○-CHO, ○○-KU, TOKYO-TO | 2004 |
| ○ | ○○ ○○ | ○-○○-○, ○○-CHO, ○○-KU, TOKYO-TO | 2004 |
| ○ | ○○ ○○○ | ○-○○-○, ○○-CHO, ○○-SHI, ○○-KEN | 2004 |
| ● | ○○ ○○ | ○-○○-○, ○○-CHO, ○○-SHI, ○○-KEN | 2004 |
| ○ | ○○ ○○ | ○-○○-○, ○○-CHO, ○○-SHI, ○○-KEN | 2004 |
| ○ | ○ ○○○ | ○-○○-○, ○○-CHO, ○○-SHI, ○○-KEN | 2004 |
| ○ | ○○ ○○ | ○-○○-○, ○○-CHO, ○○-SHI, ○○-KEN | 2004 |
| ○ | ○○ ○○ | ○-○○-○, ○○-CHO, ○○-SHI, ○○-KEN | 2003 |
| ○ | ○○ ○○ | ○-○○-○, ○○-CHO, ○○-SHI, OSAKA-FU | 2003 |
| ○ | ○○○ ○○ | ○-○○-○, ○○-CHO, ○○-SHI, ○○-KEN | 2003 |
| ○ | ○○ ○○ | ○-○○-○, ○○-CHO, ○○-SHI, ○○-KEN | 2003 |
| ○ | ○○ ○○ | ○-○○-○, ○○-CHO, ○○-SHI, ○○-KEN | 2003 |
| ○ | ○○ ○○ | ○-○○-○, ○○-CHO, ○○-SHI, ○○-KEN | 2003 |

FIG. 12

MARK TYPE IMAGE NAVI-SHEET (FOR TEXT)

1. PRINT SETTING

| PRINT SHEET SIZE | A4 ● | B5 ○ | A5 ○ | POST-CARD ○ | | ORIENTATION OF PAPER | POR-TRAIT ○ | LAND-SCAPE ● |

| PRINT QUALITY LEVEL | FAST ● | GENERAL ○ | FINE ○ | | DETAILS OF PRINTING | BOTH-SIDE ● | TWO PAGES PER SHEET ● | FOUR PAGES PER SHEET ○ |

2. IMAGES AND NUMBER OF PRINTS

| NUMBER OF PRINTS | 2 ○ | 3 ○ | 4 ○ | 5 ○ |

3. ERASURE

| ERASE | ○ |

4. TEXT SELECTION

| PRINT/ERASE | TITLE | SAVED DATE | NUMBER OF PAGES |
|---|---|---|---|
| ○ | OOOOOOOOOO | 2005/01/01 14:00 | 20 |
| ○ | OOOOOOO | 2005/01/01 12:35 | 8 |
| ● | OOOOOOOOOO | 2004/12/31 18:05 | 5 |
| ○ | OOOOOOO | 2004/12/01 14:02 | 5 |
| ○ | OOOOOOOOOOOOOOOO | 2004/12/01 14:01 | 1 |
| ○ | OOOOOO | 2004/12/01 14:00 | 1 |
| ● | OOOOOOO | 2004/11/15 9:30 | 26 |
| ○ | OOOOOOOOOO | 2004/11/15 9:30 | 2 |
| ○ | OOOOOOOO | 2004/11/14 20:03 | 1 |
| ○ | OOOOOOOOOO | 2004/09/15 10:22 | 18 |
| ○ | OOOOOOOOOO | 2004/09/01 13:48 | 15 |
| ○ | OOOOOOOOOOOOOOOO | 2004/08/29 11:22 | 34 |

FIG. 13

MARK TYPE IMAGE NAVI-SHEET (FOR TEXT)

1. PRINT SETTING

| PRINT SHEET SIZE | A4 ○ | B5 ○ | A5 ○ | POST-CARD ○ | | ORIENTATION OF PAPER | POR-TRAIT ○ | LAND-SCAPE ○ |

| PRINT QUALITY LEVEL | FAST ○ | GENERAL ○ | FINE ○ | | DETAILS OF PRINTING | BOTH-SIDE ○ | TWO PAGES PER SHEET ○ | FOUR PAGES PER SHEET ○ |

2. IMAGES AND NUMBER OF PRINTS

| NUMBER OF PRINTS | 2 ○ | 3 ○ | 4 ○ | 5 ○ |

3. ERASURE

| ERASE | ● |

4. TEXT SELECTION

| PRINT/ERASE | TITLE | SAVED DATE | NUMBER OF PAGES |
|---|---|---|---|
| ○ | ○○○○○○○○○○ | 2005/01/01 14:00 | 20 |
| ○ | ○○○○○○○○ | 2005/01/01 12:35 | 8 |
| ○ | ○○○○○○○○○○ | 2004/12/31 18:05 | 5 |
| ○ | ○○○○○○○○ | 2004/12/01 14:02 | 5 |
| ○ | ○○○○○○○○○○○○○○○○ | 2004/12/01 14:01 | 1 |
| ○ | ○○○○○○ | 2004/12/01 14:00 | 1 |
| ○ | ○○○○○○ | 2004/11/15 9:30 | 26 |
| ○ | ○○○○○○○○○○ | 2004/11/15 9:30 | 2 |
| ○ | ○○○○○○○○ | 2004/11/14 20:03 | 1 |
| ○ | ○○○○○○○○○○ | 2004/09/15 10:22 | 18 |
| ○ | ○○○○○○○○○○ | 2004/09/01 13:48 | 15 |
| ● | ○○○○○○○○○○○○○○○○ | 2004/08/29 11:22 | 34 |

IMAGE PROCESSING APPARATUS AND CONTROL METHOD OF IMAGE PROCESSING APPARATUS

BACKGROUND OF THE INVENTION

1. Field of the Invention

The present invention relates to an image processing apparatus including image printing means, image reading means and storage means capable of storing plural kinds of data, and to a control method of the image processing apparatus.

2. Description of the Related Art

Conventionally, in an apparatus having an image reading unit based on an optical line scanner and the like, such as a printer, a copying machine, a facsimile, or further a multi-function printer (MFP: may be called as a multifunction printer, a composite image processing apparatus, a composite machine and the like) in which a facsimile function, a memory card, an HDD, a DVD, an MO and the like are incorporated in a casing, there is known a technique in which a mark type sheet (which is called by various names such as mark (type) sheet, navi-sheet, order sheet, index sheet and thumbnail sheet, but in the following, is called as "mark type navi-sheet") is read for controlling printout and image data processing (for example, Japanese Patent Application Laid-Open No. 2004-34584)

Generally, as shown in FIG. 7, the mark type navi-sheet is a sheet of plain paper with about a size of A4, printed with columns to be marked for specifying print quality level, number of prints or erasure, and with a column in which images stored in a storage device are displayed in reduced size (thumbnail). Then, in the known technique, this mark type navi-sheet is marked by a user as shown in FIG. 8, and the presence or absence of the marks and the positions of the marks are read by a reading unit, thereby enabling the printing, erasing and managing of image data (files) stored in a printing apparatus to be performed.

At present, a printer which is provided with a memory card slot and which is capable of printing a photographic image stored in a memory card without being connected to a personal computer, and a printer provided with a so-called "photo-direct printing" function for printing photographic image data stored in a memory in a digital camera by connecting an external device connection terminal provided for the printer to the digital camera, are commercially available. Even in such apparatuss, the mark type navi-sheet can be used.

For example, in an apparatus in which a print head of a print unit can be replaced with an optical scanner head, that is, in an apparatus which is capable of performing image reading by any method, the mark type navi-sheet as shown in FIG. 7 can be used at the time when a photographic image in a memory card is printed by the apparatus whose print unit can be replaced.

As shown in FIG. 7, photographic images stored in a memory card are printed in the reduced thumbnail form on the mark type navi-sheet. In addition, mark boxes for selecting the number of prints and the print quality level are also printed on the mark type navi-sheet. A user selects photographic images desired to be printed, the number of prints, the print quality level, and the like and marks the mark type navi-sheet. Next, the print unit is replaced with the scanner head, and the mark type navi-sheet is read, so that the marked positions are detected. Then, the regular printing of the selected photographic images is performed on a glossy paper for photograph printing, and the like, in accordance with the marked number of prints and the marked print quality level.

In recent years, the mark type navi-sheet is practically used for a composite image processing apparatus having a print unit and a reading unit, i.e., for a so-called composite machine. For example, an ink jet composite machine mainly for home use, is required to perform processing for copy printing, storing scanned photographic images in a memory card, and printing photographic image data in the memory card, and the like, without being connected to a personal computer. With the use of the mark type navi-sheet, it is possible to make such an apparatus control even relatively complicated processing without the use of a personal computer. Therefore, the mark type navi-sheet is extremely useful.

Further, ink jet composite machines include a type which is not provided with a display unit for image display, and a type in which a display unit is provided but the display area is limited. When such an apparatus is used without the intervention of a personal computer, a user cannot visually check the kinds of photographic image data stored in a memory card, and hence, the mark type navi-sheet is extremely useful for such apparatus.

On the other hand, in recent years, the capacity of memory card has been increased, and a removable (portable) HDD allowing external connection, and the like, is commercially available. When such mass storage is connected to or incorporated into a printer and a composite image processing apparatus such as an ink jet composite machine, the number of image data is extremely increased to hundreds, thousands and tens of thousands. In particular, if the capacity of storage device in the image processing apparatus of this kind is further increased, various kinds of and large quantity of data are also considered to be introduced from plural external devices, such as, for example, a digital camera, a portable storage and a facsimile.

Further, in such a case, it is anticipated that in addition to photographic images, text data and various kinds of image data such as post card image data are stored. The need for processing for simply printing and managing these data by using an image processing apparatus, such as a printer and an ink jet composite machine, has been increased.

However, the conventional mark type navi-sheet is constituted mainly for the purpose of the print control and management of photographic image data, and hence, only one form of conventional mark type navi-sheet can be used for one kind of image (mainly photographic image) in conventional apparatuss.

That is, there is a problem that the conventional mark type navi-sheet is not made to correspond to plural kinds of data, and hence is not capable of handling various kinds of and large quantity of data which include post card images such as New Year's card, text such as office document and book, film image, business card data, and the like.

In particular, a composite machine and composite system which are provided with an HDD and a mass memory, and a composite machine and composite system which can be connected to an external device, such as a CD/DVD-ROM drive, and an MO, are used for various purposes ranging from personal use to business use, as a result of which in many cases, various kinds of data need to be stored and managed in these machines and systems. Accordingly, it is considered to be very convenient that plural kinds of mark type navi-sheets adapted to these various kinds of data could be used.

SUMMARY OF THE INVENTION

The present invention has been made in view of the above described problems. An object of the present invention is to enable an image processing apparatus to cope with plural kinds of data and to surely perform printout and data management of various kinds of and large quantity of data.

Further features of the present invention will become apparent from the following description of exemplary embodiments (with reference to the attached drawings).

BRIEF DESCRIPTION OF THE DRAWINGS

FIGS. 6A, 6B, 6C and 6D are illustrations showing examples of display of the multifunction printer employing the present invention.

FIG. 7 is an illustration showing a constitution of a mark type navi-sheet (for photograph) according to the present invention.

FIG. 11 is an illustration showing a constitution of a mark type navi-sheet (for post card, address book form) according to the present invention.

FIG. 12 is an illustration showing a constitution of a mark type navi-sheet (for text, at the time of printing) according to the present invention.

FIG. 13 is an illustration showing a constitution of a mark type navi-sheet (for text, at the time of erasure) according to the present invention.

DESCRIPTION OF THE EMBODIMENTS

In the following, preferred embodiments according to the present invention will be described with reference to the drawings. Embodiments relating to a multifunction printer (MFP), which include at least an image scanner and a printer engine, are shown below.

Figure 1:
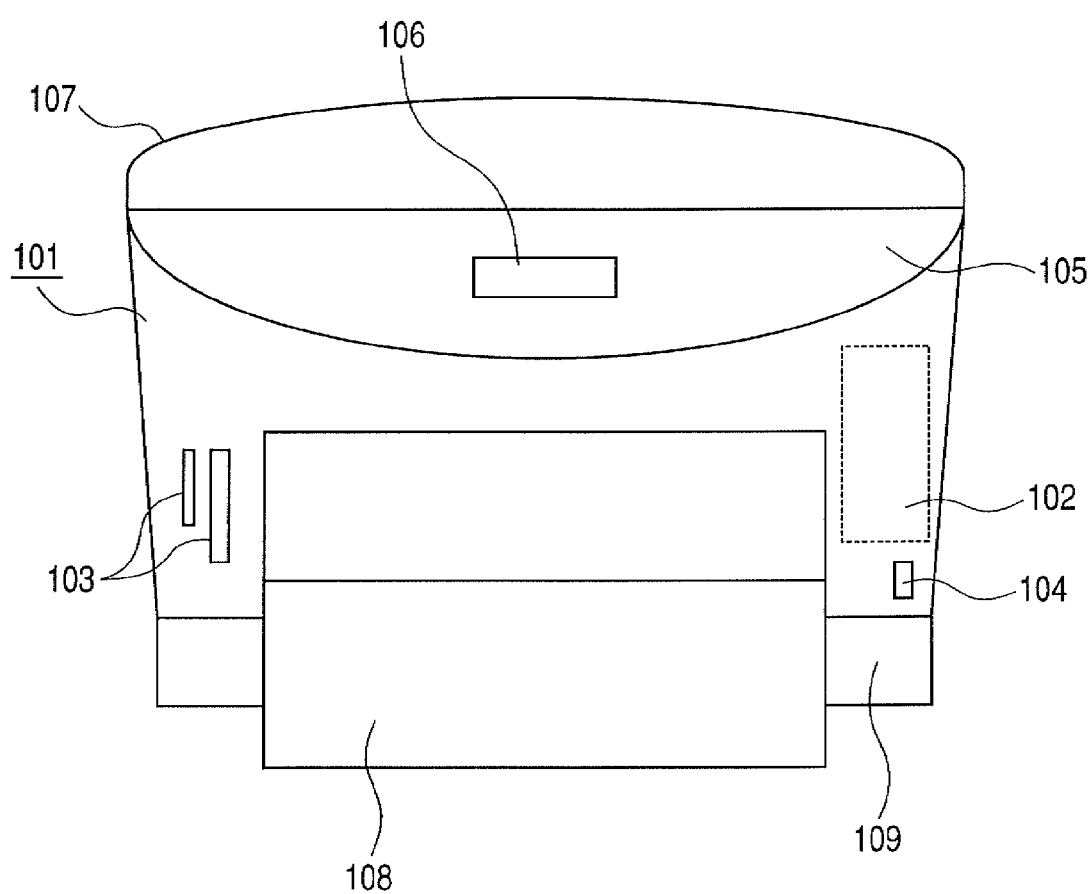
FIG. 1 is an illustration showing a constitution of a multifunction printer employing the present invention.

FIG. 1 shows an external constitution a multifunction printer (MFP) 101 according to the present embodiment, seen from the obliquely upper side of the front of the printer. The MFP 101 in FIG. 1 mainly comprises a print unit (printer engine) and a scanner unit (image scanner). In these units, the print unit is an ink jet type serial printer and the scanner unit is a flathead scanner with a CCD reading system. The detailed constitution of the print unit (printer engine) and the scanner unit (image scanner) will be described below.

AN HDD 102 for saving various image data and applications is housed in the right side of the MFP 101, and memory card slots 103 for reading/writing from/into a memory card used for a digital camera and the like are installed on left side.

In the present embodiment, two kinds of openings for the memory card slots 103 are provided in order to cope with plural kinds of memory cards Further, on the right side of the MFP 101, an external device connection terminal 104 (for example, USB interface) for effecting connection with external devices, such as a digital camera, a DVD/CD-ROM drive, a removable HDD, is provided.

An operation unit 105 operated by plural operation buttons is provided on the upper surface of MFP 101 on the front side, and a character type LCD 106 which displays the state of the MFP is arranged in the center of the upper surface.

Figure 3:
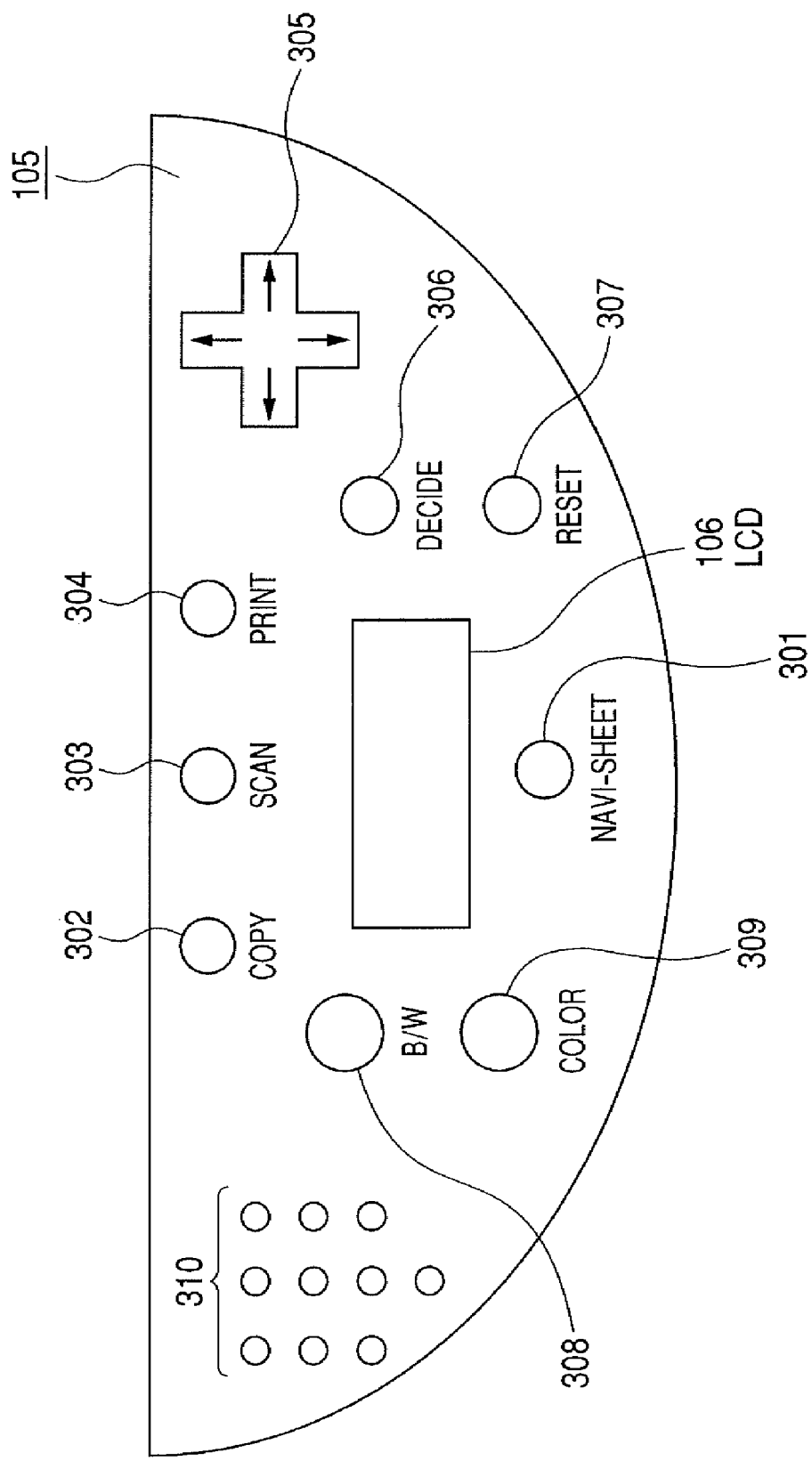
FIG. 3 is an illustration showing a constitution of an operation unit of the multifunction printer employing the present invention.

FIG. 3 shows the operation unit 105 viewed from above. The operation unit 105 is provided with operation means (buttons/keys) as will be described below, in addition to the above described LCD 106.

In FIG. 3, reference numeral 301 denotes a navi-sheet button. As will be described below, by operating the navi-sheet button, it is possible to start a user interface which performs control of print/scan operation of a mark type navi-sheet, and of selection of the kind of the mark type navi-sheet in the print/scan operation.

Reference numeral 302 denotes a copy button for specifying processing in which image data read by a copying operation, that is, by the scanner unit, are stored by the print unit.

Reference numerals 303 denotes a scan button for specifying the start of image reading in the scanner unit.

Reference numeral 304 denotes a print button for specifying processing for making image data recorded and outputted by the print unit.

Reference numeral 305 denotes a direction operation button (cursor key) used such as to specify menu items displayed by the LCD 106.

Reference numeral 306 denotes a decide button (or entry key) used such as to decide the settings selected on the basis of the menu items.

Reference numeral 307 denotes a reset button used such as to cancel a menu item and mode which are set once by a user.

Reference numeral 308 denotes a monochrome button, and 309 denotes a color button. These buttons are used to specify monochrome/color mode in the printing or scanning operation. Reference numeral 310 denotes ten keys, which are mainly used to input numerical values.

As described above, the MFP 101 according to the present embodiment comprises the print unit, the scan unit, the incorporated HDD 102, the memory card slot 103, and the external device connection terminal 104, and is thereby capable of making scanned data stored in a memory card mounted to the slot 103, the incorporated HDD 102 or an external device connected to the external device connection terminal 104, without being connected to a PC. Further, the MFP 101 is also capable of directly printing image data stored in these storage devices.

Figure 2:
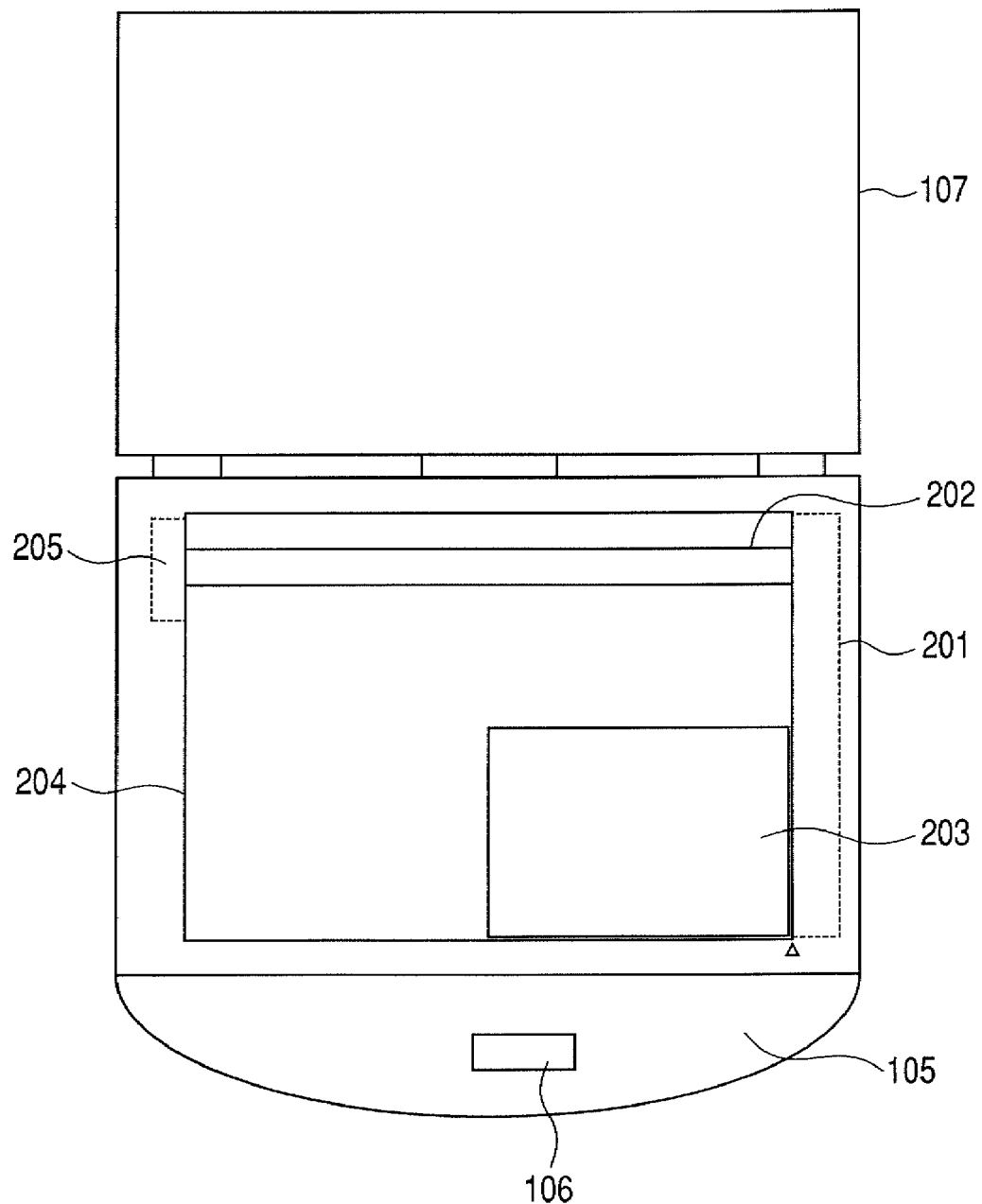
FIG. 2 is an illustration showing a constitution of a reading unit of the multifunction printer employing the present invention.

Here, the constitution of the scanner unit of the MFP 101 is explained. FIG. 2 shows the scanner unit in the MFP 101 viewed from the above in the state where a top cover 107 is opened. The scanner unit is constituted as a flat-bed scanner by a scanner carriage 201, a shaft 202 supporting the scanner carriage 201, a glass 204, and a scanner carriage drive motor 205. The scanner carriage 201, which is constituted by components, such as a light source, a mirror, a lens and a CCD, is arranged to be moved on the shaft 202 by the driving force of the scanner carriage drive motor 205, and to thereby optically read an image of a manuscript (or original sheet) 203.

When an image is scanned, the top cover 107 of the MFP 101 is raised, and the manuscript 203 to be scanned is arranged on the glass 204 of the scanner. Then, the top cover 107 is closed, and the scan button 303 in the operation unit 105 in FIG. 3 is pressed. When the scan button 303 is pressed, the light source in the scanner carriage 201 is turned on. Then, the scanner carriage 201 is moved on the shaft 202 while irradiating the manuscript 203 with light. Thereby, the light reflected from the manuscript 203 is read by the CCD. The image data optically read in this way are automatically stored in the HDD 102 in a predetermined image data format, for example, the JPEG format and the PDF format.

When a certain manuscript is read by the scanner, the size of the manuscript is detected by the scan unit. Then, the kind of the image, such as, for example, business card, photograph, post card, A4 (text) and film, is judged on the basis of the size of the manuscript (or on the basis of the image analysis such as OCR), and the like. After the kind of the image data is discriminated, the image data are stored in the HDD 102. For example, according to the JPEG format, or the Exif or DCF format which are the extended format of the JPEG format, arbitrary information can be recorded as so-called tag data in an image file. Thus, the kind of the image, such as business card, photograph, post card, A4 (text), and film, can be recorded in the image data itself by using these formats.

Figure 4:
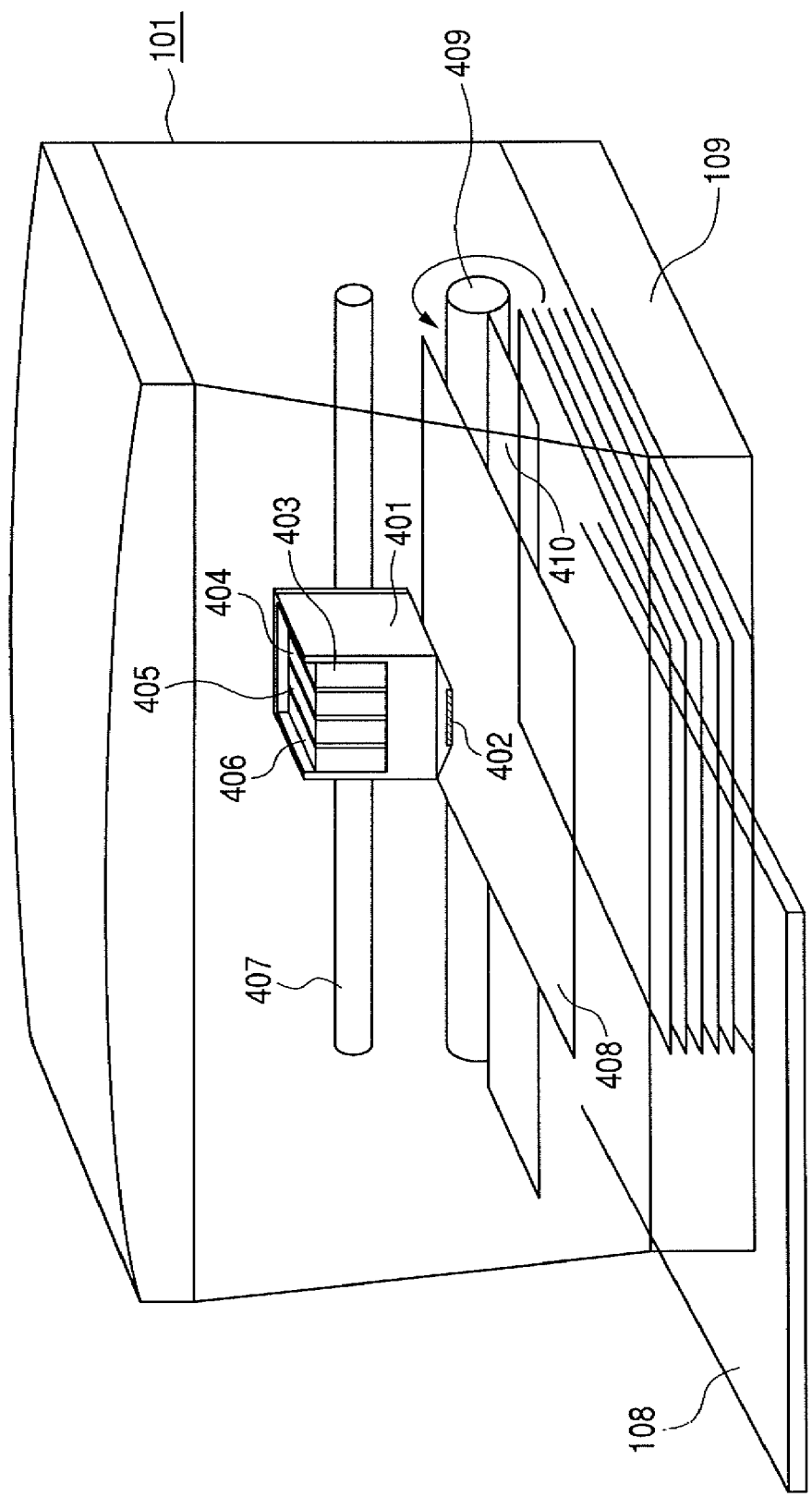
FIG. 4 is an illustration showing a constitution of a print unit of the multifunction printer employing the present invention.

Next, the print unit of the MFP 101 is explained. FIG. 4 shows a constitution of the print unit in the MFP 101. As shown in FIG. 4, the print unit comprises a printer carriage 401, a print head 402 provided for the lower part of the printer carriage 401, an ink tank (with four colors: black 403, cyan 404, magenta 405, yellow 406 are arranged from right), a shaft 407 supporting the printer carriage 401, a feed roller 409 for feeding print sheet 408, a platen 410 supporting the print sheet 408, and a carriage and feed drive motor (not shown).

In a printout operation, a print sheet 408 on the top of a sheet supplier 109 is pulled in U shape by using the feed roller 409 and the drive motor. Then, as soon as the leading edge of the print sheet 408 reaches below the print head 402, the printer carriage 401 is reciprocated in the transverse direction, so as to print one line by making minute ink droplets ejected toward the print sheet (whose material is however not limited to the paper) 408 from the print head 402. Thereafter, the print sheet 408 is fed by one line, and the printer carriage 401 is moved to perform the printing operation once more. When the printing is finished by the repetition of the above described operations, the print sheet is discharged to a discharge tray 108, and the printing operation is completed.

Figure 5:
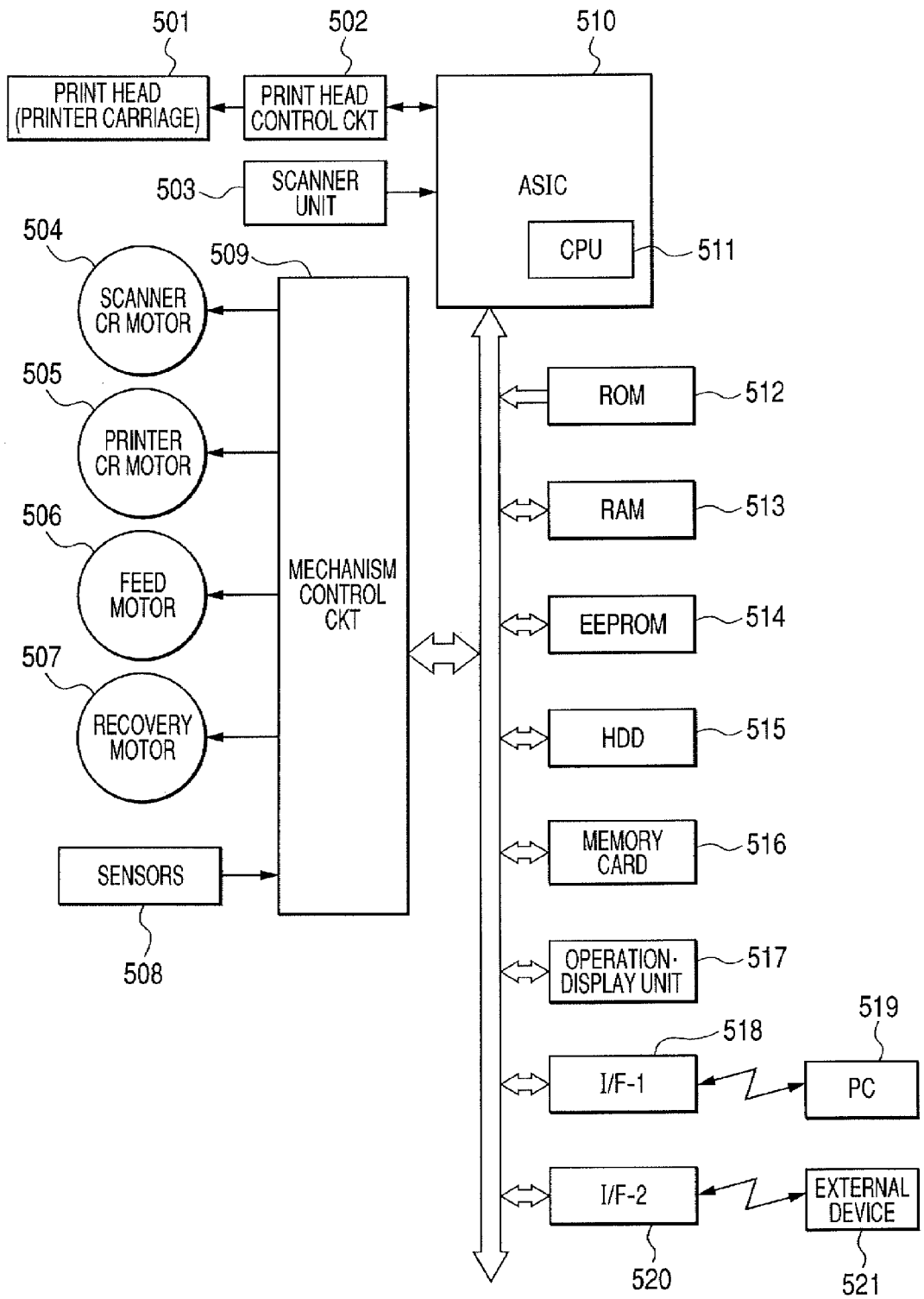
FIG. 5 is an illustration showing a constitution of a control system of the multifunction printer employing the present invention.

Note that the HDD 102 incorporated in the MFP 101 (as shown in FIG. 1 and FIG. 5 as will be described below), has a size of 1.8 inch and a storage capacity of about 80 GB, and is capable of performing the backup storage of data of a memory card, the backup storage of image data of an apparatus which is externally connected, and the storage of image data at the time of scanning operation, and the like. In the HDD 102, photographic data in the JPG format stored in the memory card and the like, image data (of business card, photograph, film, post card, text, and the like) in the PDF format, which image data are converted into the PDF format at the time of scanning operation, and applications necessary for formatting a check type image navi-sheet or an operation of the MFP, are stored.

FIG. 5 shows a constitution of a control system of the MFP 101 according to the present embodiment. In FIG. 5, reference numeral 502 denotes a print head control circuit which generates a driving pulse for electrically controlling a print head 501 on the printer carriage, and for making the ink ejected on the basis of image data, 503 denotes a scanner unit for optically reading an image, and 504 denotes a scanner CR motor for moving the scanner unit 503.

Reference numeral 505 denotes a printer CR motor for moving the printer carriage, 506 denotes a feed motor for feeding a print medium, and 507 denotes a recovery motor for driving a pump and the like which recovers the clogging of the nozzle of the print head 501 and the like.

Reference numeral 508 denotes sensors for checking the operation of the print unit and the scan unit, and 509 denotes a mechanism control circuit which performs control and management of various motors and sensors.

Reference numeral 510 denotes an ASIC which includes a CPU 511 and which performs overall control of each unit in accordance with the processing procedure as described below, and 512 denotes a ROM which stores a program corresponding to the processing procedure executed by the ASIC 510. The processing procedure as will be described below can be stored, for example, in the ROM 512.

Reference numeral 513 denotes a RAM having an area for temporarily storing parameters and scanned data in the process of executing the processing procedure, 514 denotes a nonvolatile memory, such as an EEPROM, for storing the state of the print head 501 even at the time when a power supply of the apparatus is turned off, 515 denotes an HDD having an area for storing image data and applications, and 516 denotes a memory card which can be inserted and extracted and which can be used for other apparatus, such as a digital camera and a PC.

Reference numeral 517 denotes an operation/display unit having operation buttons for performing an operation for turning on the power supply, an operation for online/off-line setting with respect to a host device, and an operation desired by a user, and having a display for displaying an operation state and a name of file stored in the HDD 515 and the memory card 516, and the like.

A PC 519 as a host apparatus connected via an interface 518 performs input and output of image data to and from the MFP, and also performs the processing of data of images and the like relating to the printing and scanning operations.

An external device 521 is an external device such as a digital camera and an optical disk, and is connected via an interface 520.

Next, an operation of the above described constitution is described. Here, a method is explained, by which different kinds of data stored in the HDD 102, especially here, image data, such as business card, photograph, film, post card and text, are printed by using a mark type navi-sheet. First, a mark type navi-sheet of an image desired to be printed is selected and printed.

When the "navi-sheet button 301 in the operation unit 105 shown in FIG. 3 is pressed, a menu screen for selecting which of the printing of the mark type navi-sheet and the scanning of the mark type navi-sheet is performed, is displayed in the LCD 106 as shown in FIG. 6A. Here, since the mark type navi-sheet is printed, the arrow is positioned at the characters of print by the direction operation button 305, and then the decide button 306 is pressed.

Thereby, a display shown in FIG. 6B is displayed by the LCD 106, so as to enable a user to select a kind of storage from which image data are read. The user selects and decides the kind of storage from which image data are read, by the same operation as described above. In FIG. 6B, the user selects, for example, the HDD as the storage, and then presses the decide button 306.

Next, FIG. 6C is displayed, and a kind of image data desired to be printed is selected. In the present embodiment, it is possible to print out a mark type navi-sheet which is suitable for each kind of image data desired to be printed, and to use the printed mark type navi-sheet.

In FIG. 6C, a mark type navi-sheet for photograph is selected by the user. Then, as shown in FIG. 6D, the number of the specified kind of image data in the specified storage and the number of the mark type navi-sheets are displayed. Note that the number of the mark type navi-sheets to be printed is set to one as a default, but the number of the mark type navi-sheets to be printed in the stage in FIG. 6D may be arranged to be changed.

Then, when the decide button 306 in the operation unit 105 is pressed, the print unit is operated, so that the mark type navi-sheet for photograph is printed in A4 size (of plain paper), as shown in FIG. 7.

FIG. 7 shows a mark type navi-sheet 701 for photograph printed by the print unit. In the mark type navi-sheet (for photograph) 701 shown in FIG. 7, two kinds of mark columns of "1. Print setting" 702 and 703 for selecting the sheet size and the presence of margin, and of "2. Images and number of prints" 704 and 705 for selecting the image printed in a thumbnail form and the number of prints, are printed. Note that the mark type navi-sheet (for photograph) 701 shown in FIG. 7 is the same as the conventional mark type navi-sheet for photograph, as described in the section of background art.

After the mark type navi-sheet (for photograph) 701 shown in FIG. 7 is printed, the user smears away the mark parts in the mark columns 702 to 705 with a pencil and the like, which mark parts correspond to printing conditions such as desired sheet size and marginless printing, image desired to be printed, and number of prints of the image.

Figure 8:
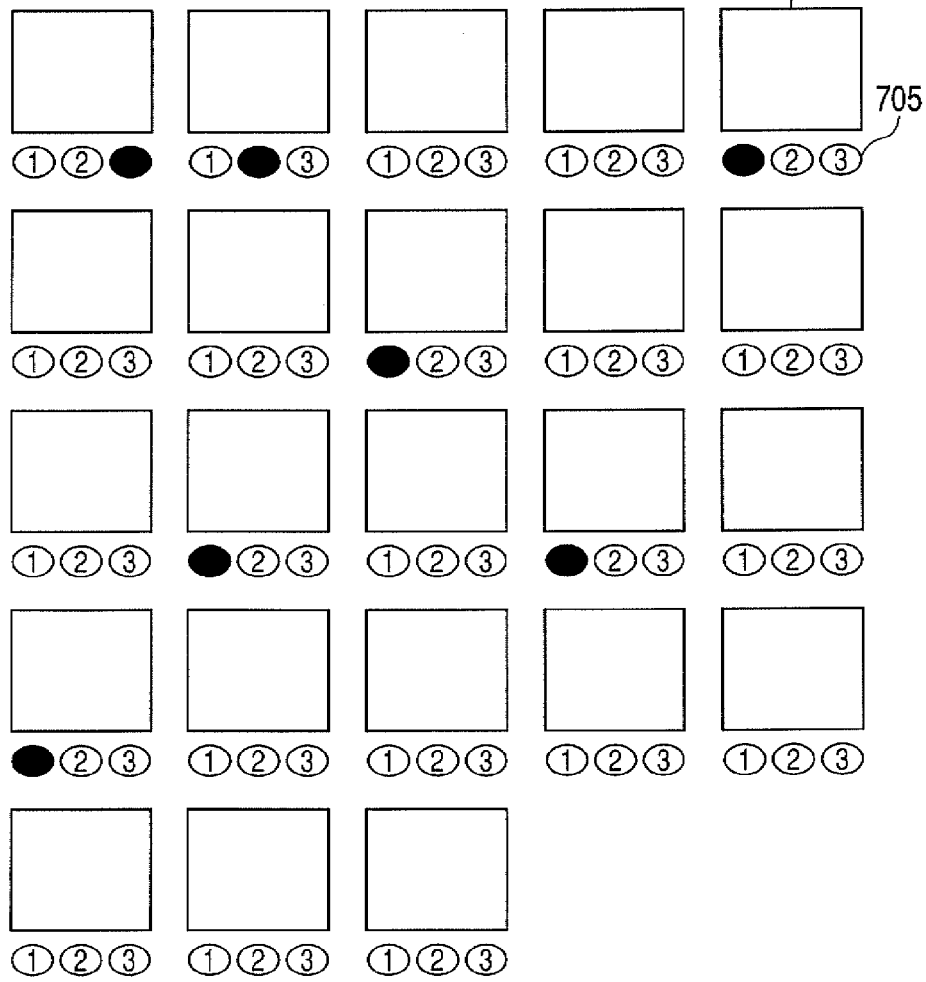
FIG. 8 is an illustration showing a constitution of a mark type navi-sheet (for photograph) according to the present invention.

FIG. 8 shows an example of a state of the mark type navi-sheet which has been marked by the user. The size of the image to be printed and the presence of margin can be selected in the mark columns 702 and 703 of "1. Print setting", but in FIG. 8, a printing condition with the sheet size of L-size and with the margin is selected.

Further, in mark columns 704 and 705 of "2. Images and number of prints", images and the number of prints are selected. In the mark type navi-sheet (for photograph) 701 shown in FIG. 7 and FIG. 8, all the photographic images 704 out of 23 photographic images stored in the HDD 102 are displayed in the thumbnail form. The set of numbers of 1, 2 and 3 below each of the photographic images 704 is the mark column 705 for selecting the number of prints. While looking at the photographs 704, the user selects photographs desired to be printed and the number of prints of the photographs, and smears away the selected marks. Note that for photographs which do not need to be printed, the marks below the photographs need only be left without being smeared away. Further, when the number of photographic images exceeds 25, a second mark type navi-sheet is printed on the next sheet in order to specify the photographic image data other than those printed on the first mark type navi-sheet.

After the smearing of all the marks is finished, the user puts the mark type navi-sheet (for photograph) 701 on the glass 204 of the scan unit. Then, the user loads the paper supplier 109 with L-size glossy papers, and presses the navi-sheet button 301 in the operation unit 105.

Thereby, the display shown in FIG. 6A is displayed in the LCD 106, and the user matches the position of the arrow with the position of the characters of scan, and presses the decide button 306. Then, the scanner carriage 201 is operated and the smeared positions on the mark type navi-sheet (for photograph) 701 are read. The print setting and the number of sheets which are marked with respect to the associated image data are judged, so that the regular printing of the image data is performed by the print unit.

As described above, by using the mark type navi-sheet, the user is capable of selecting image, print quality level, and number of prints, and allowing the regular printing to be performed, while simply looking at the images in the storage, even without using an LCD and a PC for displaying the images.

Figure 9:
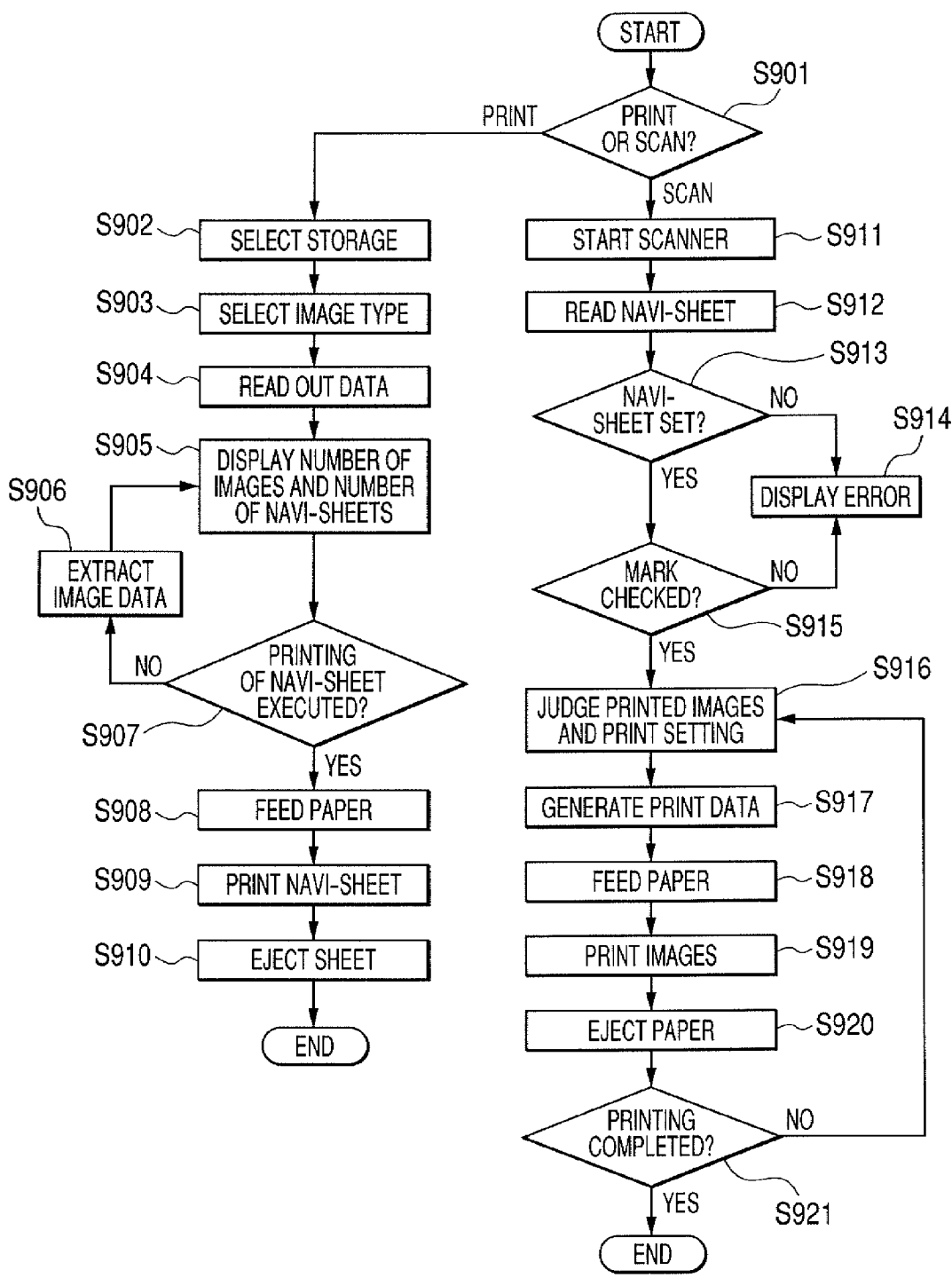
FIG. 9 is a flow chart showing a data processing procedure according to the present invention.

Here, the processing procedure for printing the mark type navi-sheet and for specifying the printing operation by the mark type navi-sheet is shown in FIG. 9.

When a mark type navi-sheet is handled, the navi-sheet button 301 in the operation unit 105 is pressed, irrespective of the printing or scan operation, as described above. After pressing the navi-sheet button 301, the user selects whether the mark type navi-sheet is printed or scanned, by the operation unit (step S901: FIG. 6A).

Next, when the mark type navi-sheet is to be printed, the storage (HDD, memory card, external device) from which the image data is read, is selected (S902: FIG. 6B).

Then, the kind (kind of photograph, post card, text, and the like) of image desired to be printed is selected (S903: FIG. 6C). Accordingly, the selected image data are read from the selected storage (S904). At this time, the number of print data and the number of the mark type navi-sheets to be printed are displayed on the character LCD (S905: FIG. 6D).

By taking a look at the above display results, the user judges whether or not the mark type navi-sheet is printed (S907). For example, in preparation for the case where the number of the mark type navi-sheets is increased, and where the printing of the mark type navi-sheets needs to be cancelled, it is arranged to make it possible to narrow down the image data on the basis of photographed date, filename, and the like, to reduce the number of mark type navi-sheets to be printed, and then to confirm the number of prints once more for judging whether or not the printing is performed (S906).

When the mark type navi-sheet is decided to be printed in step S907, the print unit is operated to feed the A4 sheet (S908), the mark type navi-sheet is printed by the print unit (S909), and then the printed mark type navi-sheet is discharged (S910).

On the other hand, when the scan of the mark type navi-sheet is selected, the scanner unit is started (S911), and the mark type navi-sheet is read by the scanner unit (S912). Then, whether or not a proper mark type navi-sheet is read is judged by checking, from the read scan data, whether the set navi-sheet is not marked (S913), or marked (S914), and the like. When there is an error, an error message is displayed on the character LCD (S914).

When there is no error in steps S913 and S914, the marked position is determined from the read scan data, the image to be printed and the settings relating to the print control are judged (S916), and the print data are generated (S917). Subsequently, the print unit is started and the generated print data are printed (feeding: S918, image printing: S919, discharging (or sheet ejection): S920). When the printing of all the images is finished (S921), the operation of the MFP is ended.

Note that for example, the determination processing in step S913, the processing for detecting print images and print settings in step S916, the processing for generating print data in step S917 can be easily and surely performed, by arranging such that the kind of the mark type navi-sheet, such as for photograph, for post card and for text, is printed by using a bar code and the like.

Figure 10:
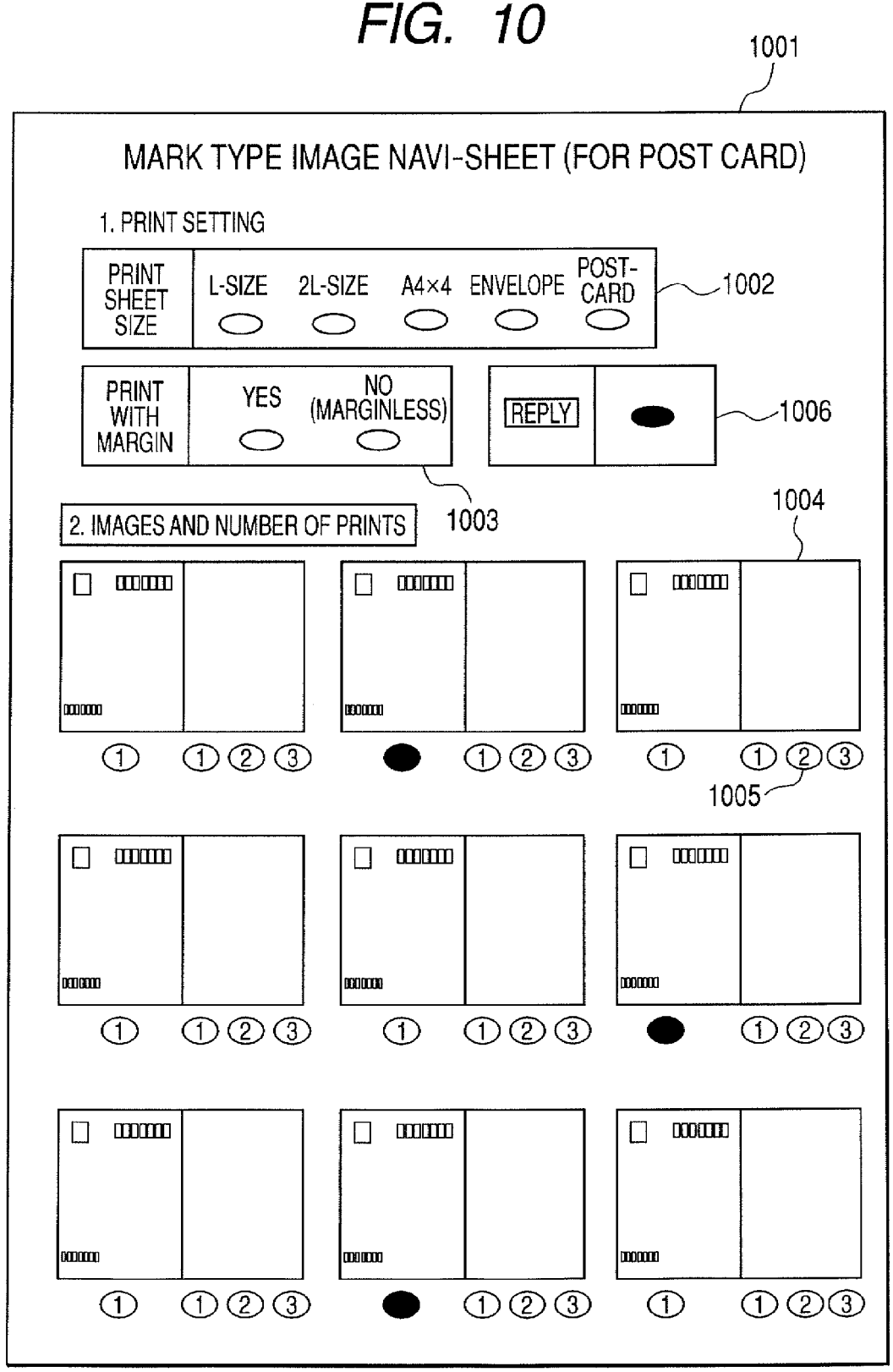
FIG. 10 is an illustration showing a constitution of a mark type navi-sheet (for post card, thumbnail form) according to the present invention.

Next, the mark type navi-sheet for the post card used for post card image data stored in the HDD 102 is explained. FIG. 10 and FIG. 11 show examples of differently constituted mark type navi-sheets for post card.

The mark type navi-sheet for the post card in FIG. 10 and FIG. 11, are printed in step S909 in FIG. 9, when the "post card" is selected as the kind of image data in step S903 in FIG. 9 (by the user interface in FIG. 6C).

In the MFP 101 having the scanner unit as in the case of the present embodiment, it is possible that front and rear faces of a post card desired to be stored are read in the scanner unit, and the image data of the post card are stored in the storage, such as the HDD 102. The read data is stored together with read date data, for example, in the PDF format (which may be either image format, or character format which results from the character recognition processing when OCR processing can be applied at the time of reading). Further, of course, the post card images stored in the storage, such as the HDD 102 may be image data (or text data) of a post card made by a word processor software for PC, and the like.

By storing post card image data in the storage in this way, it is possible to eliminate the need for preparing the address face again, when the post card image data are repeatedly utilized (printed).

Further, when the stored post card image is the same as the received post card image, processing such as to create a reply can also be performed, without the use of a personal computer, by subjecting the character part of the address face to the character recognition processing (OCR) and by reversely printing the addressee and addresser information. For example, it is possible to perform print processing in such a manner that the received post card is subjected to the character recognition processing, that the addressee and addresser information (name, address, postal code number, telephone number) are reversely arranged, and a reply is automatically created (see Japanese Patent Application Laid-Open No. H08-164652).

Further, when the post card image data are stored, a photograph on the rear face of the post card can also be additionally printed in a desired size, such as L-size.

FIG. 10 shows an example of a constitution of the mark type navi-sheet for post card 1001 in consideration of the above described printing method. In the normal printing, similarly to the navi-sheet for photograph as described above, sheet size and marginless printing (on the rear face of post card) can be set by the mark columns 1002 and 1003 in "1. Print setting", and image and number of prints can be set by the mark columns 1004 and 1005 in "2. Images and number of prints".

Further, in the example shown in FIG. 10, a reply mark 1006 is provided in "1. Print setting". Thus, it is possible to create a reply of a received post card by smearing away this reply mark 1006. That is, the reply mark 1006 is used for automatically preparing and printing the reply by reversely arranging the addressee and addresser information (name, address, postal code number, telephone number). Thus, when this reply mark 1006 is marked, the stored post card image itself is not printed, but the reply with respect to the stored post card image is printed.

Further, in the example shown in FIG. 10, thumbnail images 1004 are printed in the column of "2. Images and number of prints", in each of which images the address face of the post card is arranged on the left side and the rear face of the post card is printed on the right side. And the number of prints corresponding to an image part can be specified by the column 1005 for specifying the number of sheets which is provided below the image part.

By making the scan unit read the mark type navi-sheet (for post card) 1001 marked as shown in FIG. 10, the regular printing of a post card suitable for the purpose can be performed. Note that the reply mark 1006 may be printed such that the printing method of post card is specified for each of the thumbnail images 1004 of post cards (either printing of the post card image itself or printing of the reply is specified). Further, the column (1005) for specifying the number of sheets in FIG. 10 is formed such that one copy can be specified for the front face and that up to three copies can be specified for the rear face, but any combination of the number of sheets can be specified.

Note that the mark type navi-sheet (for post card) 1001 shown in FIG. 10 is assumed to have the size of about A4 size. For this reason, the number of post card images as small as nine sheets can be displayed. Accordingly, when the characters and images are small, there is possibility that the character part (mail information) cannot be visually read. Therefore, a constitution of the mark type navi-sheet for post card as shown in FIG. 11 can also be considered, in which the number of post card images is increased so as to enable the characters necessary for mail to be surely checked.

FIG. 11 shows an exemplary constitution of the mark type navi-sheet (for post card) 1101 in the address book form. In the mark type navi-sheet shown in FIG. 11, the sheet size (post card, envelope, A4×4, and the like) can be specified by a mark column 1102 of "1. Print setting" column. Further, special character fonts (thin, bold, brush) for address printing can be specified by a mark column 1103. Further, a reply mark 1106 for printing the reply is also provided similarly to FIG. 10.

Further, in the mark type navi-sheet shown in FIG. 11, data of addresser name 1108 of each post card image, address 1109, and year 1110 (based on the sending and receiving date of each post card or file creation date data, and the like) are arranged in the column of "2. Address selection" so as to be formed as a table in the address book form. Note that a mark column 1107 at the top of this table in the address book form is a mark column for specifying whether or not the printout corresponding to the data is performed.

The mail information is made into the address book form, according to the mark type navi-sheet shown in FIG. 11. Thus, post card data for twenty persons can be displayed, thereby enabling the mail information to be visually checked. Note that these character data in the address book form may be formed by automatically registering data created from each post card image by the processing such as OCR, or may be data manually inputted by the user.

When the address face of a returning document is created by marking the mark type navi-sheet as shown in FIG. 11, it is possible to easily create an address face in such a way that print sheet size, address writing font and reply, are marked and specified in the mark columns 1102, 1103, and 1106 of "1. Print setting", that desired destination to which the reply is sent, is selected by the mark 1107 at the top of the address book of "2 Address selection", and that the marked navi-sheet 1101 is made to read by the scanner unit.

In this way, in the mark type navi-sheet for post card, the thumbnail type (1001 in FIG. 10), and the address book type (1101 in FIG. 11) can be selectively used depending upon the application. The thumbnail type (1001) is convenient for extra printing of the rear face of the post card, while the address book type (1101) is convenient for creating the address face. Therefore, it is preferred to arrange such that any of the navi-sheets in the forms shown in FIG. 10 and FIG. 11 can be printed, thereby enabling the user to specify which of the forms of navi-sheets is printed, by a suitable menu screen.

Next, an exemplary constitution of the mark type navi-sheet for text is explained. The mark type navi-sheet in FIG. 12 shows a mark type navi-sheet 1201 for text (text image).

The mark type navi-sheet for the text shown in FIG. 12 (and FIG. 13) is printed in step S909 in FIG. 9, when the "text" is selected as the kind of image data in step S903 (in the user interface in FIG. 6C).

The text image data assumed in the present embodiment are image data which are formed by making book, journal, office document, and the like read by the scanner unit and stored in (a storage such as) the HDD 102 in the PDF format (or other image file formats, such as JPEG and TIFF).

The mark type navi-sheet 1201 for text as shown in FIG. 12 can be used in order to print the text image data stored in the HDD 102, or further to erase the text image data.

The text image data spread over plural pages in many cases, and it is hard to distinguish the files by the mark type navi-sheet in the thumbnail form as shown in FIG. 7 and FIG. 10. Thus, in the items of "4. Text selection" of the mark type navi-sheet shown in FIG. 12, title 1209, save date 1210, and number of pages 1211 are displayed in a tabular format. Among these items, the beginning of sentences obtained by subjecting the text image data to the character recognition processing, file names, and characters manually inputted by the user, are displayed in the title 1209. When the character strings of the title 1209 are a file format, such as PDF and JPEG, they can be embedded and recorded in the file. Further, the storage date 1210 and the number of pages 1211 can be extracted from the date of file, the format data portion of file, and the like. Further the mark column 1208 for specifying print/erase is attached to the top of these tabular print display.

Further, as for each item of "1. Print setting", in addition to the mark column 1202 for specifying sheet size, there are printed a mark column 1203 for specifying the print quality level, a mark column 1204 for specifying the orientation of sheet on which the regular printing of text image data is performed, and a mark column 1205 for specifying the allocation printing (detailed print) of 2 in 1, 4 in 1, and the like.

Further, in the item of "2. Images and number of prints", a mark column 1206 for specifying the number of prints is provided.

Further, in the item of "3. Erasure", a mark column 1207 for specifying the processing for erasing the text file from the HDD 102 is provided. The use of this mark column will be described below with reference to FIG. 13.

In the example shown in FIG. 12, by using each of the above described mark columns, the user selects each of the printing conditions so as to set the sheet size as A4 sheet, the print quality level as quick, and the details of printing as double-side printing and two-print for one page (2 in 1). The mark type navi-sheet in this state is made to be scanned, and thereby the regular printing of the two text image data specified by the mark column 1208 in the above described print setting, is performed.

By using the mark type navi-sheet in FIG. 12 as shown in FIG. 13, it is possible to erase specified files from the HDD 102.

In the mark type navi-sheet for text shown in FIG. 13, which has the same format as that shown in FIG. 12, the delete mark 1207 and the lowest mark column 1208 in the table of text selection are smeared away. By such marking, it is possible to specify the processing for erasing the text image data corresponding to the mark column 1208 smeared away, from the HDD 102.

By making the mark type navi-sheet in the state shown in FIG. 13 read, the text image data selected by the erasure mark can be deleted from the inside of the HDD 102.

In FIG. 12 and FIG. 13, text image data are assumed, but text data handled by the mark type navi-sheet shown in FIG. 12 and FIG. 13 are not necessarily the "image" form, and may be raw data in a text format and document data of a word processor, and the like.

Further, even in the case of the text image data, by making the source data distinguished by the difference in application, such as Excel and Word, it is possible to prepare mark type navi-sheets for text which are different for each application, such as for Word and Excel data.

Further, in the case where the mark type navi-sheet for photograph as shown in FIG. 7, the mark type navi-sheet for post card as shown in FIG. 10, and the mark type navi-sheet for text as shown in FIG. 12, are printed, that is, where the data formats corresponding to these mark type navi-sheets are specified with the user interface (step S904 in FIG. 9) shown in FIG. 6C, only data with these data formats are enumerated and printed by the mark type navi-sheet. When the identification information indicating the data format is embedded into the file, the determination of required data for this purpose can be performed by such identification information. Further, when the database in which the data formats of the respective files in the HDD 102 are totalized is prepared, the information of the database can be used. Further, even when such information is not available, a technique in which data of about several to several hundreds bytes at the head of a file are read, and the file content is identified on the basis of the read data, (such as, for example, a method used by file (1) command in the UNIX (registered trademark)), is known, and hence, such technique may be used.

According to the above described embodiments, in the state where the user interface for specifying the kind of data to be printed or specifically processed is provided, when the kind of image data to be printed or specifically processed, is specified, the mark type navi-sheet suitable for the kind of data is printed out, and the desired printing or the specified processing (file erasure in the above described example) can be performed by using the printed mark type navi-sheet.

According to the above described constitution, an advantage is obtained, in that printing and data arrangement can be easily performed in a composite machine and a composite system, and the like, which have only poor user interface means that is unable to display an image.

Note that in the above described embodiments, the ink jet head is used as the printing method, but the technique provided by the present invention is not limited by the printing method. It goes without saying that the same constitution can also be implemented, even when other electrophotographic systems, and printer engines, such as a piezo system, a thermal transfer system, are used.

Further, the kinds of image data and the kinds of the mark type navi-sheets corresponding to the image data, according to the present invention, are not limited to photographic image, post card and text. The present invention can also be applied without limitation to those such as mail documents other than film, Fax, business card, and post card, provided that the need and kind of their image can be recognized. For example, as for the data of business card shown in FIG. 6C, it is considered that any of the constitutions of the mark type navi-sheet for post card shown in FIG. 10 and the mark type navi-sheet for text shown in FIG. 12 can be utilized. Thus, which of the navi-sheet formats is used may be arbitrarily selected by those skilled in the art. Of course, in the case of film, the constitution of the mark type navi-sheet for photograph as shown in FIG. 7 can be applied.

In the case of Fax, reply data can be generated on the basis of the constitution of the mark type navi-sheet for post card as shown in FIG. 10. In a composite machine mounted with a Fax function, the transmission and reception data of Fax are distinguished from each other and thereby different kinds of mark type navi-sheets may also be created for each kind of the data.

Further, in the case where a character recognition function is provided, characters of post cards are recognized, and the post cards are discriminated to normal post card, New Year's card, greeting card, and the like, so as to be stored. Then, mark type navi-sheets for each of the discriminated postcards may be created.

Further, in storing images, the kind of image data is judged not only on the basis of the size of the images, but on the basis of the extension/application of image, image source data (RGB data), the character/text based on the character recognition, and the setting by the user. Further, the storage for storing the images is not limited to the HDD, but DVD-ROM, CD-ROM, MO, memory card, and the like, may also be used as the storage.

Further, the external device connected to the MFP is not limited to the digital camera, but a removable storage, a facsimile, and the like, may also be used as the external device connected to the MFP.

The present invention is not limited to the composite machine in which the print unit, the reading unit, and the storage unit are integrated, but may be applied to a composite system which is constituted by connecting a printing device, an external device and a storage, which are housed in separate casings, respectively. The software for implementing the present invention is stored beforehand in a ROM and the like of a product in which the present invention is implemented. In addition to this, the software may also be constituted so as to be installed and upgraded via a network.

According to the above described constitution, there are provided excellent effects that the user is capable of controlling the printout or management of data with the above described user interface, by allowing the printout to be performed, or by allowing the mark type sheet for data of the kind which is adapted to the kind of data to be managed and stored in the storage means, to be printed. Thereby, the printout corresponding to plural kinds of data and containing various kinds of and large quantity of data, and the management of the data can be easily and surely performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-231480, filed Aug. 10, 2005, which is hereby incorporated by reference herein in its entirety.

What is claimed is:

1. An image processing apparatus comprising:
    a printing unit;
    a reading unit;
    a determining unit configured to determine a kind of data stored in a memory the kind of data being selected from plural kinds;
    a print control unit which enables the printing unit to print a mark type sheet including an item corresponding to a kind determined by the determining unit and the entry fields corresponding to the item; and
    a control unit which controls printout or management processing of data corresponding to the entry field judged as being entered by a user based on image data obtained by reading the mark type sheet by the reading unit.

2. The image processing apparatus according to claim 1 further comprising:
    an operating unit configured to be operated by a user;
    wherein the kind of the data is selected from the plural kinds by the operation to the operating unit.

3. The image processing apparatus according to claim 1 further comprising:
    a mounting unit configured to mount an external memory;
    wherein the determining unit determines a kind of data stored in the external memory mounted to the mounting unit.

4. The image processing apparatus according to claim 1, wherein the kinds of the data are distinguished by data contents of photograph, film, mail document, text, Fax, business card, and the like, or by application relating to generation of the data.

5. The image processing apparatus according to claim 1, wherein management processing of the data corresponding to the item in the mark type sheet includes at least erasure processing of the data from the memory.

6. The image processing apparatus according to claim 1, wherein the mark type sheet is printed out in thumbnail expression of the data, or a list table format of text expression of the data.

7. The image processing apparatus according to claim 1, wherein the determining unit determines a kind of the file stored in a memory.

8. A method for controlling an image processing apparatus including a printing unit, and a reading unit, said method comprising:
    determining a kind of data stored in a memory, the kind of data being selected from plural kinds;
    causing the printing unit to print a mark type sheet including an item corresponding to the kind determined in the determining step and the entry fields corresponding to the item; and
    executing printout or management processing of the data corresponding to the entry field judged as being entered by a user based on image data obtained by reading the mark type sheet by the reading unit.

9. The method according to claim 8, wherein the determined kind of data is the kind of the file stored in a memory.

10. The method according to claim 8, wherein the kinds of the data are distinguished by data contents of photograph, film, mail document, text, Fax, business card, and the like, or by application relating to generation of the data.

11. The method according to claim 8, wherein management processing of the data corresponding to the item in the mark type sheet includes at least erasure processing of the data from the memory.

12. The method according to claim 8, wherein the mark type sheet is printed out in thumbnail expression of the data, or a list table format of text expression of the data.

* * * * *